United States Patent
Fleckner et al.

(10) Patent No.: US 8,554,399 B2
(45) Date of Patent: Oct. 8, 2013

(54) METHOD FOR OPERATING A DRIVE TRAIN

(75) Inventors: Marco Fleckner, Leonberg (DE); Sebastian Ruger, Seesen (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 1030 days.

(21) Appl. No.: 12/536,554

(22) Filed: Aug. 6, 2009

(65) Prior Publication Data

US 2010/0087978 A1   Apr. 8, 2010

(30) Foreign Application Priority Data

Oct. 8, 2008   (DE) .................... 10 2008 050 737

(51) Int. Cl.
*B60L 9/00* (2006.01)
*B60L 11/00* (2006.01)
*G05D 3/00* (2006.01)

(52) U.S. Cl.
USPC ............................. 701/22; 701/65; 701/101

(58) Field of Classification Search
USPC .................. 701/22, 65, 101; 180/65.2, 65.29; 320/104
See application file for complete search history.

(56) References Cited

U.S. PATENT DOCUMENTS

| | | | | |
|---|---|---|---|---|
| 5,703,776 A | * | 12/1997 | Soung | 701/65 |
| 6,098,734 A | * | 8/2000 | Kawamura | 180/65.245 |
| 6,470,983 B1 | * | 10/2002 | Amano et al. | 180/65.235 |
| 6,856,866 B2 | * | 2/2005 | Nakao | 701/22 |
| 6,991,053 B2 | * | 1/2006 | Kuang et al. | 180/65.235 |
| 7,898,405 B2 | * | 3/2011 | Burke et al. | 340/461 |
| 8,083,015 B2 | * | 12/2011 | Kobayashi | 180/65.21 |
| 2001/0024104 A1 | * | 9/2001 | Suzuki | 320/104 |
| 2002/0069000 A1 | * | 6/2002 | Nakao | 701/22 |
| 2008/0029320 A1 | * | 2/2008 | Fleckner et al. | 180/65.2 |

FOREIGN PATENT DOCUMENTS

| | | |
|---|---|---|
| DE | 10 2006 001 201 | 7/2007 |
| DE | 10 2006 034 933 | 1/2008 |
| DE | 10 2007 024 471 | 11/2008 |
| EP | 0 676 308 | 10/1995 |
| EP | 0676308 * | 10/1995 |
| EP | 676308 A1 * | 10/1995 |
| EP | 1 136 311 | 3/2001 |
| EP | 1136311 A2 * | 9/2001 |
| EP | 1 211 121 A2 | 11/2001 |
| EP | 1211121 A2 * | 6/2002 |
| JP | 11-8909 | 1/1999 |
| JP | 2007223404 | 9/2007 |

\* cited by examiner

*Primary Examiner* — Khoi Tran
*Assistant Examiner* — Jorge Peche
(74) *Attorney, Agent, or Firm* — Gerald E. Hespos; Michael J. Porco; Matthew T. Hespos

(57) ABSTRACT

A method is provided for operating a motor vehicle drive train having an internal combustion engine, an electric motor and an electrical energy storage. An actual charge state of the electrical energy storage is detected and compared with an established setpoint charge state to determine one of several operating modes for the drive train. The setpoint charge state is determined as a function of an instantaneous driving state of the motor vehicle so that conclusions can be drawn about imminent deceleration, imminent acceleration or imminent cruise control, instantaneous transmission data and/or instantaneous hybrid drive data. Range boundaries and/or range extents of operating modes are shifted as a function of the setpoint charge state.

9 Claims, 1 Drawing Sheet

METHOD FOR OPERATING A DRIVE TRAIN

CROSS-REFERENCE TO RELATED APPLICATIONS

This application claims priority under 35 USC 119 to German Patent Application No. 10 2008 050 737.7 filed on Oct. 8, 2008, the entire disclosure of which is incorporated herein by reference.

BACKGROUND OF THE INVENTION

1. Field of the Invention

The invention relates to a method for operating a drive train of a motor vehicle.

2. Description of the Related Art

A drive train of a hybrid vehicle comprises a hybrid drive and a transmission. The hybrid drive typically comprises an internal combustion engine, an electric motor and an electrical energy storage means. A hybrid vehicle is capable of purely electromotive driving with the internal combustion engine switched off so that the hybrid vehicle is driven solely by the electric motor with the aid of the energy stored in the electrical energy storage means. The hybrid vehicle also is capable of hybrid driving with the vehicle driven by both the electric motor and the internal combustion engine. The hybrid vehicle also operates periodically in a recuperation mode where the electric motor is operated as a generator to charge the electrical energy storage means. A hybrid vehicle also may have a kinematic storage means or a pressure storage means, with a corresponding motor, instead of an electric motor and an electrical energy storage means.

An operating mode for the drive train of a hybrid vehicle is selected in an effort to operate the drive train in an optimum manner. This selection of the optimum operating mode takes into account the consumption of the internal combustion engine and the degree of efficiency of the electric motor and the electrical energy storage means. Additionally, the selection of the operating mode determines whether the electrical energy storage means is discharged, charged or kept at an unchanged charging level. Hence, the operating mode selection is a function of a setpoint charge state and an actual charge state of the electrical energy storage means. The actual charge state of the electrical energy storage means can be detected by measurement. The setpoint charge state of said electrical energy storage means has to be determined in some other way.

EP 1 211 121 B1 discloses charging and discharging electrical energy storage means and therefore determining a setpoint charge state of the electrical energy storage means as a function of data from a navigation apparatus. The navigation apparatus contains route information about the route to be covered by the motor vehicle and corresponding height information. In accordance with EP 1 211 121 B1, an operating mode for the drive train is determined on the basis of anticipatory route data of the motor vehicle provided by the navigation apparatus and this selected operating mode controls the charging or discharging of the electrical energy storage means of the hybrid drive. This method is complicated.

In view of the above, the object of the present invention is to provide a novel method for operating a drive train of a motor vehicle.

SUMMARY OF THE INVENTION

The invention relates to a method for determining the setpoint charge state of the electrical energy storage means as a function of an instantaneous driving state of the motor vehicle in such a way that conclusions can be drawn about imminent deceleration, imminent acceleration or current speed of the motor vehicle as a function of an instantaneous speed of the motor vehicle and/or as a function of instantaneous transmission data and/or as a function of instantaneous hybrid drive data. The setpoint charge state of the electrical energy storage means then is determined as a function of these conclusions.

The method may further be operative for shifting range boundaries and/or range extents defined by the range boundaries of operating modes as a function of the setpoint charge state.

The method of the invention permits simple charging of the electrical energy storage means of a motor vehicle with a hybrid drive in a manner that is optimized in terms of the degree of efficiency. No anticipatory data, for example data from a navigation apparatus, is required to operate the drive train in accordance with the present invention. Only data about the instantaneous driving state of the motor vehicle is required to operate the drive train of the motor vehicle.

DETAILED DESCRIPTION OF THE PREFERRED EMBODIMENTS

Figure 1:
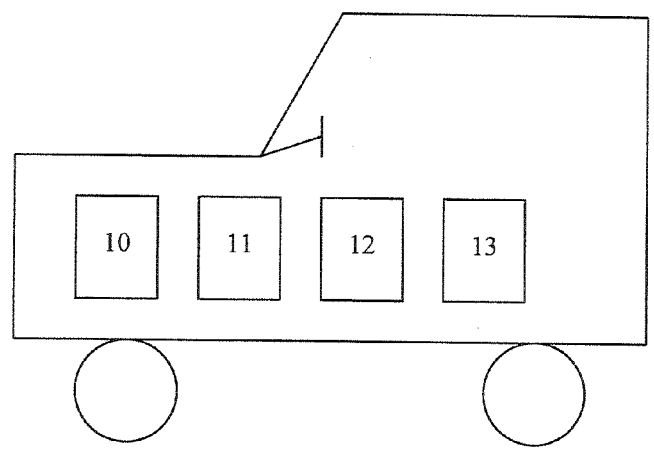
FIG. 1 is a highly schematic view of a drive train that can used for carrying out the method of the invention.

FIG. 1 schematically illustrates a motor vehicle that has a drive train with a hybrid drive comprising an internal combustion engine 10, an electric motor 11, an electrical energy storage means 12 and a transmission 13. Of course, several electric motors or electrical machines can be provided.

The transmission 13 preferably is an automatic transmission with gears that are shifted in an automated or automatic manner.

Electrical energy that can be used by the electric motor 11 is stored in the electrical energy storage means 12 of the drive train of the motor vehicle of FIG. 1 to drive the motor vehicle purely electromotively by the electric motor 11, or to assist the internal combustion engine 10 with the aid of the electric motor 11 in the event of hybrid driving.

In the recuperation mode, the electric motor 11 can be operated as a generator to charge the electrical energy storage means 12.

The charge state of the electrical energy storage means 12 also is referred to as the SOC (State Of Charge).

An actual charge state of the electrical energy storage means 12 and a setpoint charge state of said electrical energy storage means 12 are established so that the drive train of a hybrid vehicle of this type can operate in a manner that is optimized in terms of the degree of efficiency. The operating mode for the drive train is determined as a function of the actual charge state and setpoint charge state of the electrical energy storage means 12, and with the electrical energy storage means 12 being either discharged, charged or kept at a constant charge state as a function of the determined operating mode.

The actual charge state of the electrical energy storage means 12 easily can be established by measurement, either directly or using a model-based approach.

The setpoint charge state of the electrical energy storage means 12 of the invention is determined as a function of an instantaneous driving state of the motor vehicle. No anticipatory data, for example from a navigation apparatus, is required for this purpose.

The setpoint charge state of the electrical energy storage means 12 is determined in a way that conclusions can be drawn about imminent deceleration, imminent acceleration or imminent cruise control of the motor vehicle as a function of an instantaneous speed of the motor vehicle and/or as a function of instantaneous transmission data and/or as a function of instantaneous hybrid drive data. The setpoint charge state of the electrical energy storage means then is determined as a function of these conclusions. One of several operating modes for the drive train, which then serves to operate the drive train, is determined as a function of this setpoint charge state of the electrical energy storage means 12 and the actual charge state of the electrical energy storage means 12 established by measurement. The electrical energy storage means 12 then is discharged, charged or kept at a constant charge state as a function of these data.

The setpoint charge state of the electrical energy storage means 12 is established for the drive train is determined as a function of this operating mode, using instantaneous driving state data of the drive train, without having to make use of future or anticipatory data, for example data from a navigation apparatus.

The instantaneous transmission data and/or the instantaneous hybrid drive data of the drive train is used to determine an instantaneous inclination of the motor vehicle to determine the setpoint charge state of the electrical energy storage means 12 as a function of the instantaneous inclination. In this case, the instantaneous inclination of the motor vehicle can be determined from an instantaneous transmission output rotation speed of the transmission 13, from the instantaneous transmission ratio of the transmission 13, from the transmission input torque provided by the hybrid drive and from the acceleration of the motor vehicle. For example, the longitudinal acceleration of the motor vehicle is determined by the wheel rotation speed or, in the case of electric driving of the hybrid vehicle, from the rotation speed of the electrical machine. The acceleration measured by the acceleration sensor additionally contains a positive gradient component. Thus, a corresponding positive gradient can be derived geometrically by means of the forces acting in an oblique plane.

When a positive gradient is determined as an instantaneous inclination of a motor vehicle, the conclusion can be drawn that an acceleration phase of the motor vehicle is imminent. Thus, the hybrid drive has to provide a high transmission input torque even at a constant speed of the motor vehicle.

In contrast, when a negative gradient is determined as an inclination, the conclusion can be drawn that a deceleration phase of the motor vehicle is imminent. Deceleration then can be realized, for example, by operating the brake pedal, or as a constant speed in the recuperation mode.

The setpoint charge state of the electrical energy storage means 12 is determined as a function of these determinations, and, for example, appropriately utilizes recuperation potentials to charge the electrical energy storage means 12 in the event of an imminent deceleration phase of the motor vehicle.

The setpoint charge state of the electrical energy storage means 12 established in the above manner may be less than the actual charge state of said electrical energy storage means. In this situation, an operating mode for the drive train is determined for discharging the electrical energy storage means 12 and for causing a shift in the load point for the internal combustion engine 10 to a lower load point. In contrast, the setpoint charge state of the electrical energy storage means 12 may be greater than the actual charge state of said electrical energy storage means. In this situation, an operating mode of drive train is determined for charging the electrical energy storage means 12 and for causing a shift in the load point for the internal combustion engine 10 so as to raise the load point of the internal combustion engine.

Simple control for the setpoint charge state of the electrical energy storage means 12 can be established with the aid of the above-described procedure for determining the setpoint charge state of the energy storage means 12 of a hybrid drive train solely on the basis of data about the instantaneous driving state of the motor vehicle and without using anticipatory data, such as data from a navigation device. As a result, the electrical energy storage means 12 is charged in a manner that is optimized in terms of the degree of efficiency. A load point of the internal combustion engine 10 is shifted as a function of the above-described determination of the setpoint charge state for the electrical energy storage means 12 and as a function of the selected operating mode.

Figure 2:
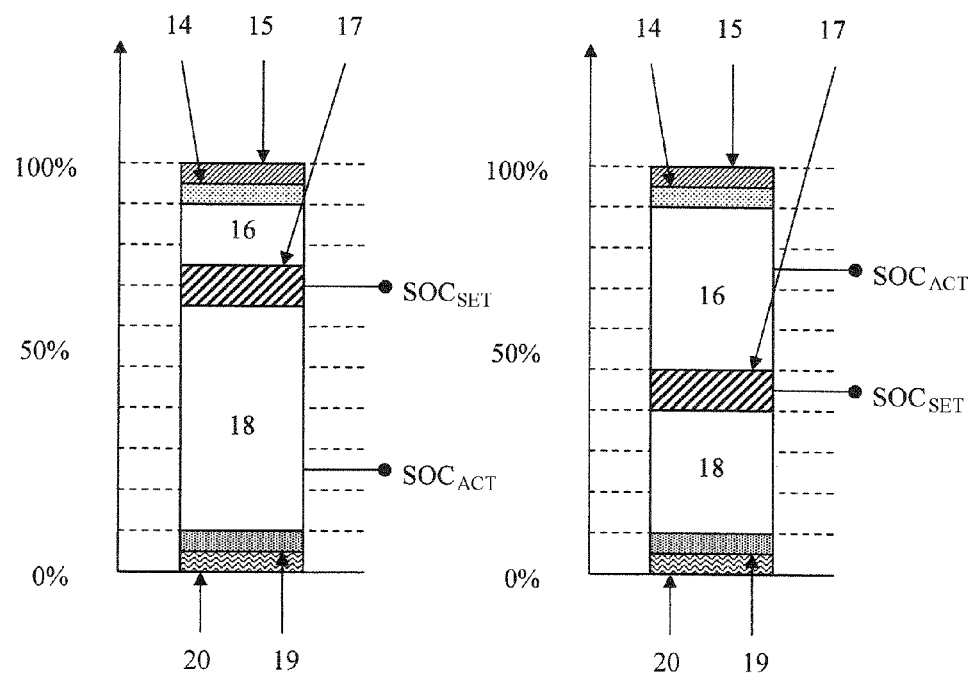
FIG. 2 is a graph for explaining the method of the invention.

FIG. 2 is a graph for explaining a further aspect of the invention, with range boundaries and/or range extents, which are defined by range boundaries, of operating modes for the drive train being shifted as a function of the setpoint charge state. More particularly, FIG. 2 shows two graphs, with the charge state of the electrical energy storage means in percent being plotted on the vertical axis of each graph.

In the exemplary embodiment shown, a total of seven operating modes 14, 15, 16, 17, 18, 19 and 20, are distributed over this charge state of the electrical energy storage means 12. The electrical energy storage means 12 is discharged in the operating modes 14, 15 and 16. Conversely, the electrical energy storage means 12 is charged in the operator modes 18, 19 and 20. The electric motor 11 of the hybrid drive generates just enough energy for an on-board electrical system requirement of the drive train to be covered in the operating mode 17 without the electrical energy storage means 12 being charged or discharged. The operating modes 14, 15 and 16 for discharging the electrical energy storage means 12 and the operating modes 18, 19 and 20 for charging the electrical energy storage means 12 differ in terms of their discharging intensity or charging intensity. More particularly, the charging intensity of the operating mode 20 is greater than the charging intensity of the operating mode 19, and the charging intensity of the operating mode 19 is greater than the charging intensity of the operating mode 18. The discharging intensity of the operating mode 15 is greater than the discharging intensity of the operating mode 14. Furthermore, the discharging intensity of the operating mode 14 is greater than the discharging intensity of the operating mode 16.

The exemplary embodiment shown in FIG. 2 shifts range boundaries and/or range extents of the operating modes 14, 15, 16, 17, 18, 19 and 20 by shifting the range boundaries of the operating mode 17, while keeping the range extent of the operating modes 14, 15, 17, 19 and 20 unchanged. More specifically, the range boundaries of the operating mode 17 are shifted as a function of the established setpoint charge state $SOC_{SET}$ of the electrical energy storage means 12 so that the setpoint charge state $SOC_{SET}$ always is within the range extent of the operating mode 17, for example in the center, in which the electric motor 11 of the hybrid drive generates just enough energy to cover an on-board electrical system requirement of the drive train, without charging or discharging the electrical energy storage means 12. The range extent defined by the range boundaries of the operating mode 17 always is 10% of the charge state of the energy storage means 12 in the illustrated embodiment. The lower range boundary of the operating mode 16 and the upper range boundary of the operating mode 18 shift as a function of this shift in the range boundaries of the operating mode 17. On the other hand, the upper range boundary of the operating mode 16 and lower range boundary of the operating mode 18 remain unchanged. As a result, the range extent of the operating modes 16 and 18 changes as a function of the established setpoint charge state $SOC_{SET}$.

The charge actual charge state $SOC_{ACT}$ detected by measurement is plotted in the two graphs of FIG. 2 in addition to the setpoint charge state $SOC_{SET}$. Setpoint charge state range boundaries and/or range extents of operating modes are shifted on the basis of the actual charge state $SOC_{ACT}$. The setpoint charge state $SOC_{SET}$ of the electrical energy storage means 12 is greater than the actual charge state $SOC_{ACT}$ of said electrical energy storage means in the left-hand graph of FIG. 2. As a result, the operating mode 18 is selected as the operating mode for the drive train for the left-hand graph of FIG. 2 to charge the electrical energy storage means 12 and thus to bring the actual charge state $SOC_{ACT}$ closer to the setpoint charge state $SOC_{SET}$.

For the right-hand graph of FIG. 2, in which the setpoint charge state $SOC_{SET}$ of the electrical energy storage means 12 is less than the actual charge state $SOC_{ACT}$ of said electrical energy storage means 12, the operating mode 16 is selected as the operating mode for the drive train to discharge the energy storage means 12 and bring the actual charge state $SOC_{ACT}$ closer to the setpoint charge state $SOC_{SET}$ of said energy storage means 12.

In contrast to the exemplary embodiment shown in FIG. 2, the operating mode 17 can adapt not only the range boundaries, but also the to range extents as a function of the established setpoint charge state $SOC_{SET}$. Additionally, the operating modes 14, 15, 19 and 20 also can adapt range boundaries and/or range extents of said operating modes.

Transitions between the individual operating modes 14 to 20 for operating the drive train are discrete in each case.

While the invention has been described with respect to a preferred embodiment, it is apparent that various changes can be made without departing from the scope of the invention as defined by the appended claims.

What is claimed is:

1. A method for operating a drive train of a motor vehicle, the drive train having a hybrid drive that comprises an internal combustion engine, an electric motor, an electrical energy storage means and a transmission, the method comprising:
   measuring an actual charge state of the electrical energy storage means;
   measuring data indicative of an instantaneous driving state of the motor vehicle and independent of any anticipatory data from a navigation apparatus;
   determining a setpoint charge for the electrical energy storage means based on the measured data indicative of the instantaneous driving state of the motor vehicle;
   comparing the measured actual charge state of the electrical energy storage means to the setpoint charge state for the electrical energy storage means;
   determining one of several operating modes for the drive train as a function of the comparison of the actual charge state and the setpoint charge state; and
   shifting range boundaries or range extents of the operating modes as a function of the setpoint charge state; and
   shifting a load point of the internal combustion engine to lowering the load point and to discharge the electrical energy storage means when the setpoint charge state of the electrical energy storage means is less than the actual charge state of said electrical energy storage means.

2. The method of claim 1, wherein the instantaneous transmission data comprises at least one of an instantaneous transmission output rotation speed, an instantaneous transmission ratio of the transmission, and a transmission input torque provided by the hybrid drive.

3. The method of claim 1, characterized in that each operating mode extends over a defined range of the setpoint charge state of the electrical energy storage means, and wherein the shifting of the range boundaries or the range extents is carried out for at least two of the operating modes as a function of the setpoint charge state.

4. The method of claim 1, further comprising shifting the range extent of an operating mode in which the electric motor of the hybrid drive generates just enough energy to cover an on-board electrical system requirement, without charging or discharging the electrical energy storage means, so that the setpoint charge state is always within the range extent of this operating mode.

5. The method of claim 1, wherein the step of measuring data indicative of an instantaneous driving state of the motor vehicle comprises determining an instantaneous inclination of the motor vehicle based on instantaneous transmission data and the instantaneous hybrid drive data and then determining the setpoint charge state of the electrical energy storage means as a function of said instantaneous inclination.

6. The method of claim 5, wherein the step of measuring data indicative of an instantaneous driving state of the motor vehicle further comprises measuring data including an instantaneous transmission output rotation speed, instantaneous transmission ratio of the transmission, transmission input torque provided by the hybrid drive and acceleration of the motor vehicle and then determining an instantaneous inclination of the motor vehicle based at least partly on the measured data.

7. The method of claim 1, further comprising shifting a load point of the internal combustion engine to raise the load point and to charge the electrical energy storage means when the setpoint charge state of the electrical energy storage means is greater than the actual charge state of said electrical energy storage means.

8. The method of claim 1, wherein the step of measuring data indicative of an instantaneous driving state of the motor vehicle are carried out to draw conclusions about imminent acceleration of the motor vehicle, the conclusions drawn about imminent acceleration include determining whether the imminent acceleration is a positive number or a negative number to indicate deceleration.

9. The method of claim 8, wherein the conclusions drawn about imminent acceleration include determining whether the imminent acceleration is a positive number, a negative number to indicate deceleration or zero to indicate constant speed.

* * * * *